US008216072B2

(12) United States Patent
Curtis et al.

(10) Patent No.: US 8,216,072 B2
(45) Date of Patent: Jul. 10, 2012

(54) LOCAL ENVIRONMENT BASED WAGERING

(75) Inventors: Scott Curtis, Durham, NC (US); Kenneth Jennings, Durham, NC (US); Michael W. Helpingstine, Chapel Hill, NC (US); Eugene Matthew Farrelly, Cary, NC (US)

(73) Assignee: Kota Enterprises, LLC, Wilmington, DE (US)

( * ) Notice: Subject to any disclaimer, the term of this patent is extended or adjusted under 35 U.S.C. 154(b) by 744 days.

(21) Appl. No.: 12/210,814

(22) Filed: Sep. 15, 2008

(65) Prior Publication Data

US 2010/0069144 A1 Mar. 18, 2010

(51) Int. Cl.

| | |
|---|---|
| ***A63F 9/00*** | (2006.01) |
| ***A63F 13/12*** | (2006.01) |
| ***G06F 19/00*** | (2006.01) |

(52) U.S. Cl. ........................................... 463/42; 463/29

(58) Field of Classification Search .................... 463/25, 463/29, 42

See application file for complete search history.

(56) References Cited

U.S. PATENT DOCUMENTS

| | | | | |
|---|---|---|---|---|
| 6,480,830 | B1 * | 11/2002 | Ford et al. | 705/7.19 |
| 2004/0058731 | A1 * | 3/2004 | Rossides | 463/42 |
| 2004/0128157 | A1 * | 7/2004 | Aquilino et al. | 705/1 |
| 2004/0203896 | A1 | 10/2004 | Deigin et al. | |
| 2004/0259626 | A1 | 12/2004 | Akram et al. | |
| 2007/0265092 | A1 * | 11/2007 | Betteridge | 463/42 |
| 2007/0293310 | A1 * | 12/2007 | Mindes et al. | 463/28 |
| 2008/0039192 | A1 * | 2/2008 | Laut | 463/25 |
| 2008/0102956 | A1 | 5/2008 | Burman et al. | |
| 2008/0154895 | A1 * | 6/2008 | Carmony | 707/6 |

OTHER PUBLICATIONS

LBSZONE, "Zero36's Location-Based Filtering Enables Mobile Gambling in Locations Where Gambling is Legal," http://www.lbszone.com/index2.php?option=com_content&task=view&id=1540&Itemid=. . . , Jan. 9, 2007, printed May 27, 2008, 1 page.
"Online Payment, Merchant Account—PayPal," http://www.paypal.com/, copyright 1999-2009 PayPal, printed Jan. 28, 2009, 2 pages.
"Apple—iPhone—View all the features of the new iPhone 3GS," http://www.apple.com/iphone/iphone-3gs/, printed Aug. 11, 2009, 5 pages.
Abstract, "Sensor networks for social networks," by Farry, M.P., Thesis, Dept. of Electrical Engineering and Computer Science, Massachusetts Institute of Technology, Feb. 2006, obtained from Dspace@MIT, at <http://dspace.mit.edu/handle/1721.1/36764>, printed Apr. 28, 2011, 3 pages.
Estrin, M., "Is the MySpace crowd lying to marketers?", Oct. 16, 2007, posted at iMedia Connection, at <http://www.imediaconnection.com/content/16993.asp>, copyrighted by iMedia Communications, Inc., printed Apr. 28, 2011, 2 pages.

* cited by examiner

*Primary Examiner* — Dmitry Suhol
*Assistant Examiner* — Carl V Larsen
(74) *Attorney, Agent, or Firm* — Withrow & Terranova, PLLC

(57) ABSTRACT

A system and method are disclosed for providing location-based wagering. In one embodiment, wagerable data associated with a location of a first user is identified. The wagerable data may be any type of data on which a wager may be based. Then, a wager recommendation is generated based on the wagerable data and returned to the first user. The first user defines a wager, and the wager is published to one or more second users located in proximity to the first user. Each of the one or more second users is enabled to accept the wager if desired. In addition, one or more winners and one or more losers of the wager may be identified and payout may then be effected.

18 Claims, 4 Drawing Sheets

LOCAL ENVIRONMENT BASED WAGERING

FIELD OF THE INVENTION

The present invention relates to personal location-based wagering.

BACKGROUND OF THE INVENTION

Wagering is a popular pastime. However, establishing a wager is typically a manual process in that a person must first identify a topic for the wager and then identify another person or person(s) that desire to accept the wager. Particularly in some environments, this may be a time-consuming process. As such, there is a desire for a system and method that enables users to quickly and easily participate in wagers.

SUMMARY OF THE INVENTION

The present invention relates to location-based wagering. In one embodiment, wagerable data associated with a location of a first user is identified. The wagerable data may be any type of data on which a wager may be based. For example, the wagerable data may be a wagerable event such as, but not limited to, a sporting event, a weather forecast for the location of the first user, information forming the basis for a trivia question related to the location of the first user, or the like. Then, a wager recommendation is generated based on the wagerable data and returned to the first user. The first user defines a wager, and the wager is published to one or more second users located in proximity to the first user. Each of the one or more second users is enabled to accept the wager if desired. In addition, one or more winners and one or more losers of the wager may be identified and payout may then be effected.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
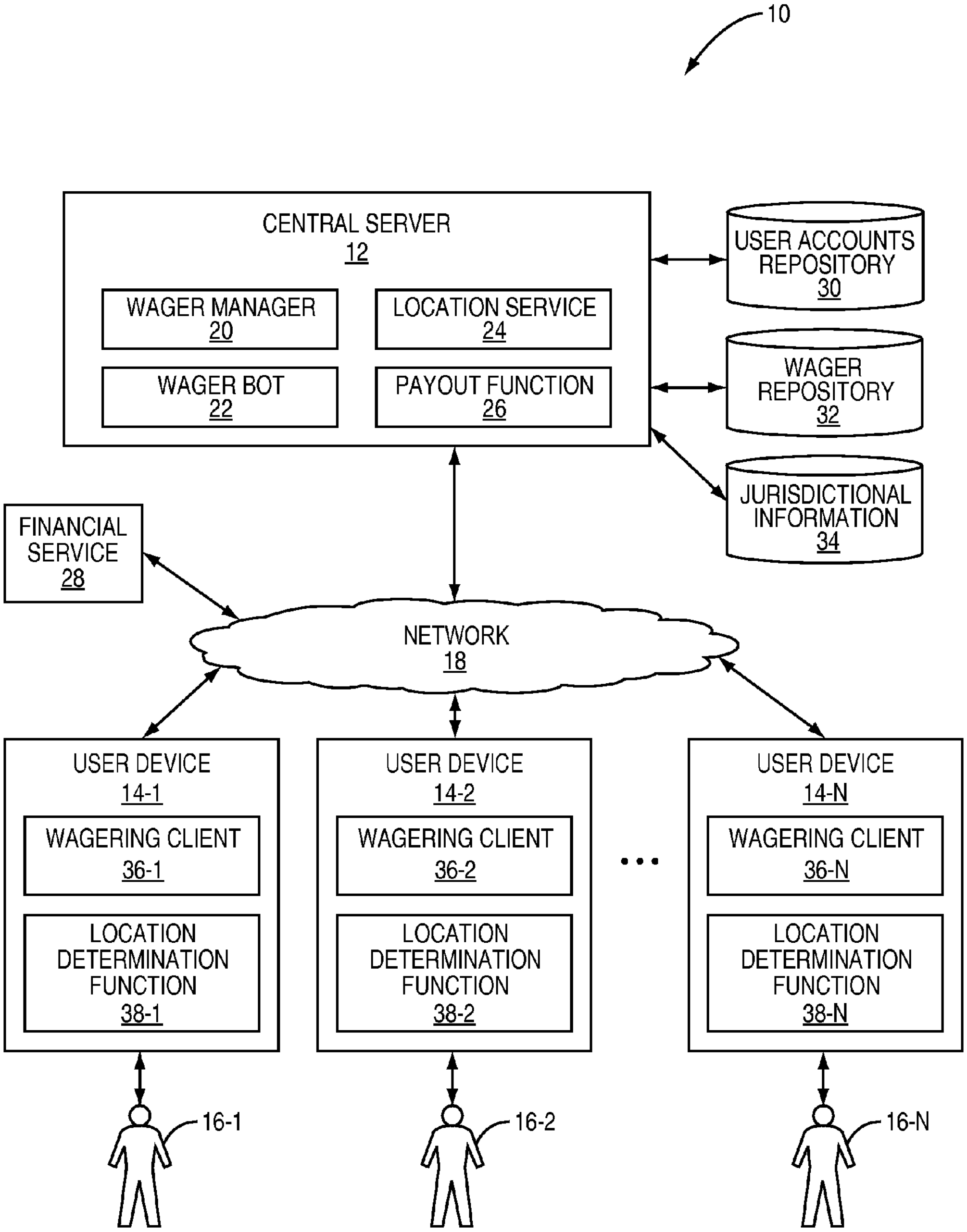
FIG. 1 illustrates a system enabling personal location-based wagering according to one embodiment of the present invention.

FIG. 1 illustrates a system 10 enabling personal location-based wagering according to one embodiment of the present invention. In general, the system 10 includes a central server 12 and a number of user devices 14-1 through 14-N having associated users 16-1 through 16-N. The central server 12 and the user devices 14-1 through 14-N are connected via a network 18. The network 18 is preferably a global network such as, for example, the Internet. However, the present invention is not limited thereto. The network 18 may be any type of Wide Area Network (WAN), Local Area Network (LAN), or the like, or any combination thereof. Further, the network 18 may include wired components, wireless components, or both wired and wireless components. Note that while only one central server 12 is shown, the system 10 may include any number of one or more central servers 12 for purposes of load-balancing and redundancy.

The central server 12 includes a wager manager 20, a wager bot 22, a location service 24, and a payout function 26, each of which may be implemented in software, hardware, or a combination thereof. The wager manager 20 generally operates to control the wagering process. The wager bot 22 searches one or more remote network sources for wagerable data. The one or more remote network sources searched by the wager bot 22 are preferably network sources connected to the central server 12 via a global network such as, for example, the Internet or World Wide Web (WWW). However, the present invention is not limited thereto. The wagerable data identified by the wager bot 22 may be wagerable events such as, for example, sporting events; weather related data such as a weather forecast; information forming the basis for trivia questions; or the like. Alternatively, the wagerable data may be provided to, for example, the user 16-1 to enable the user 16-1 to define a desired wager.

The identified wagerable data may then be utilized by the wager manager 20 to generate recommended wagers for the users 16-1 through 16-N as desired. For instance, if the wagerable data is a sporting event, the wager manager 20 may generate one or more wager recommendations such as, for example, a recommendation to wager on which team will win the sporting event, a recommendation to wager on a final score of the sporting event, a recommendation to wager on whether a specific player will score within a defined amount of time, or the like. Similarly, if the wagerable data is information forming the basis for one or more trivia questions, the wager manager 20 may generate one or more wager recommendations such as, for example, a recommendation to wager on whether other users know the answer to a trivia question, a recommendation to wager on whether the user knows the answer to the trivia question, a recommendation to wager on whether the user knows the answers to more of a set of trivia questions than other users, or the like.

The location service 24 generally operates to track the geographic locations of the users 16-1 through 16-N. More specifically, in one embodiment, the user devices 14-1 through 14-N are location-aware devices, and the locations of the user devices 14-1 through 14-N are utilized as the locations of the users 16-1 through 16-N. The location service 24 may periodically request the locations of the user devices 14-1 through 14-N from the user devices 14-1 through 14-N. Alternatively, the user devices 14-1 through 14-N may periodically provide their locations to the location service 24, provide updates to their locations to the location service 24 as needed, or the like.

The payout function 26 operates to exchange money or points, or virtual chips, once winners and losers of wagers are determined. In one embodiment, the wager manager 20 is jurisdictionally aware such that monetary wagers are only permitted when the users involved in the wager are located within a jurisdiction that allows monetary wagers. In order to perform the payout for a monetary wager, the payout function 26 may credit financial account(s) of the winner(s) of the wager and debit the financial account(s) of loser(s) of the wager according to the terms of the wager. Note that financial accounts for the users 16-1 through 16-N may be maintained by a third-party financial service 28 such as, for example, PayPal. However, the present invention is not limited thereto. Further, some jurisdictions that allow monetary wagers also impose a tax such as, for example, a 20% tax on winnings. As such, when settling a monetary wager in such a jurisdiction, the payout function 26 may withhold the tax for payment to the appropriate governmental entity before paying the winner(s) of the wager.

When the users involved in a wager are located within a jurisdiction that does not allow monetary wagers, points or virtual chips may be used instead of money. As such, once a wager is complete, the payout function 26 operates to exchange points between the winner(s) and loser(s) of the wager. In one embodiment, for at least a subset of the users 16-1 through 16-N, point totals are maintained. The points totals may be included in user accounts of the users 16-1 through 16-N stored in a user accounts repository 30. As such, when a non-monetary wager is made, the payout function 26 may exchange points by adding and subtracting points from corresponding point totals maintained for winner(s) and loser(s) of the wager according to the terms of the wager. As one exemplary alternative, the points totals for the users 16-1 through 16-N may be maintained by a third-party service. As such, the payout function 26 may instruct the third-party service to add or subtract points from the points totals of the users 16-1 through 16-N as needed.

The user accounts repository 30 includes a user account for each of the users 16-1 through 16-N. In one embodiment, the user accounts for the users 16-1 through 16-N may be created in response to registration of the users 16-1 through 16-N with the central server 12. Using the user 16-1 as an example, the user account of the user 16-1 includes information identifying a location of the user 16-1. Again, the location of the user 16-1 is obtained by the location service 24. In addition, the user account of the user 16-1 may include financial information enabling the payout function 26 to debit or credit a financial account of the user 16-1 when paying out a wager. For example, the financial information may include a financial account number of the user 16-1 at the financial service 28. Using the financial account number, the payout function 26 may credit or debit the financial account of the user 16-1 at the financial service 28 as needed. In addition to or as an alternative to the financial information, the user account of the user 16-1 may include a points value, or virtual chip value, for the user 16-1 which may be used for non-monetary wagers. Note that, in one embodiment, points may be redeemed by the user 16-1 for goods or services. For example, a particular pizza vendor may provide ten (10) points to the users 16-1 through 16-N and provide that any user that accumulates one hundred (100) points may redeem the one hundred (100) points for a free pizza.

The user account of the user 16-1 may also include user preferences. As an example, the user 16-1 may define a user preference saying that the user 16-1 is to be alerted only of sports-related wagers. As another example, the user 16-1 may define a user preference defining times at which the user 16-1 is or is not to be alerted of wagers. For example, the user 16-1 may define a user preference stating that the user 16-1 is to be alerted of wagers only from 5 PM-7 PM on Monday through Friday and anytime on Saturday or Sunday, or that the user 16-1 is not to be alerted of wagers from 8 AM-5 PM on Monday through Friday. As a final example, the user 16-1 may define user preferences such that the user 16-1 is only to be alerted of non-monetary wagers.

A wager repository 32 is maintained by the central server 12. The wager repository 32 may be hosted by the central server 12 or by a remote storage device. The wager repository 32 includes a wager definition for each active wager made through the central server 12. A wager definition for a wager may include, for example, information defining terms of the wager, information identifying a user that created the wager, and information identifying one or more users that took the wager. The terms of the wager include information identifying a subject matter of the wager (e.g., that team A will beat team B), information defining a monetary value or point value for the wager, information defining a total exposure of the creator of the wager or a maximum number of other users that may accept the wager, or the like. The information defining the subject matter of the wager may vary depending on the particular wager. For example, if the wager is that a specific player participating in a sporting event will score in the next fifteen (15) minutes, then the information defining the subject matter of the wager may include information identifying the sporting event, information identifying the specific player, information identifying the time period (e.g., start time and end time) for the wager, and information stating that the wager is that the specific player will score within the identified time period.

Jurisdictional information 34 includes information defining jurisdictions and whether monetary wagering is permissible in those jurisdictions. In the United States, the jurisdictions may be each of the fifty states. In addition, for jurisdictions allowing monetary wagering, the jurisdictional information may include any requirements or limitations placed on monetary wagers such as, for example, a tax rate to be applied to winnings from monetary wagers.

Each of the user devices 14-1 through 14-N is preferably a portable device having network capabilities such as, for example, a mobile smart phone. One exemplary mobile smart phone that may be used for the present invention is an Apple® iPhone. However, the present invention is not limited thereto. Other types of devices such as, but not limited to, personal computers may be used. The user devices 14-1 through 14-N include wagering clients 36-1 through 36-N and location determination functions 38-1 through 38-N, respectively. Using the user device 14-1 as an example, the wagering client 36-1 may be implemented in software, hardware, or a combination thereof. In general, the wagering client 36-1 enables the user 16-1 to create wagers, be alerted of wagers of other users, and accept wagers of other users. In addition, the wagering client 36-1 may respond to location requests from the location service 24 of the central server 12. Alternatively, the wagering client 36-1 may periodically report the location of the user device 14-1 to the location service 24 or provide location updates to the location service 24 as needed.

The location determination function 38-1 may be implemented in software, hardware, or a combination thereof. In one embodiment, the location determination function 38-1 is a Global Positioning System (GPS) receiver. In another embodiment, the user device 14-1 is a mobile smart phone, and the location of the user device 14-1 is determined using base station triangulation. In yet another embodiment, the user 16-1 may manually enter the location of the user 16-1.

Note that these exemplary embodiments of the location determination function 38-1 are not intended to limit the scope of the present invention. Other embodiments of the location determination function 38-1 will be apparent to one of ordinary skill in the art upon reading this disclosure and are to be considered within the scope of the present invention.

Figure 2A:
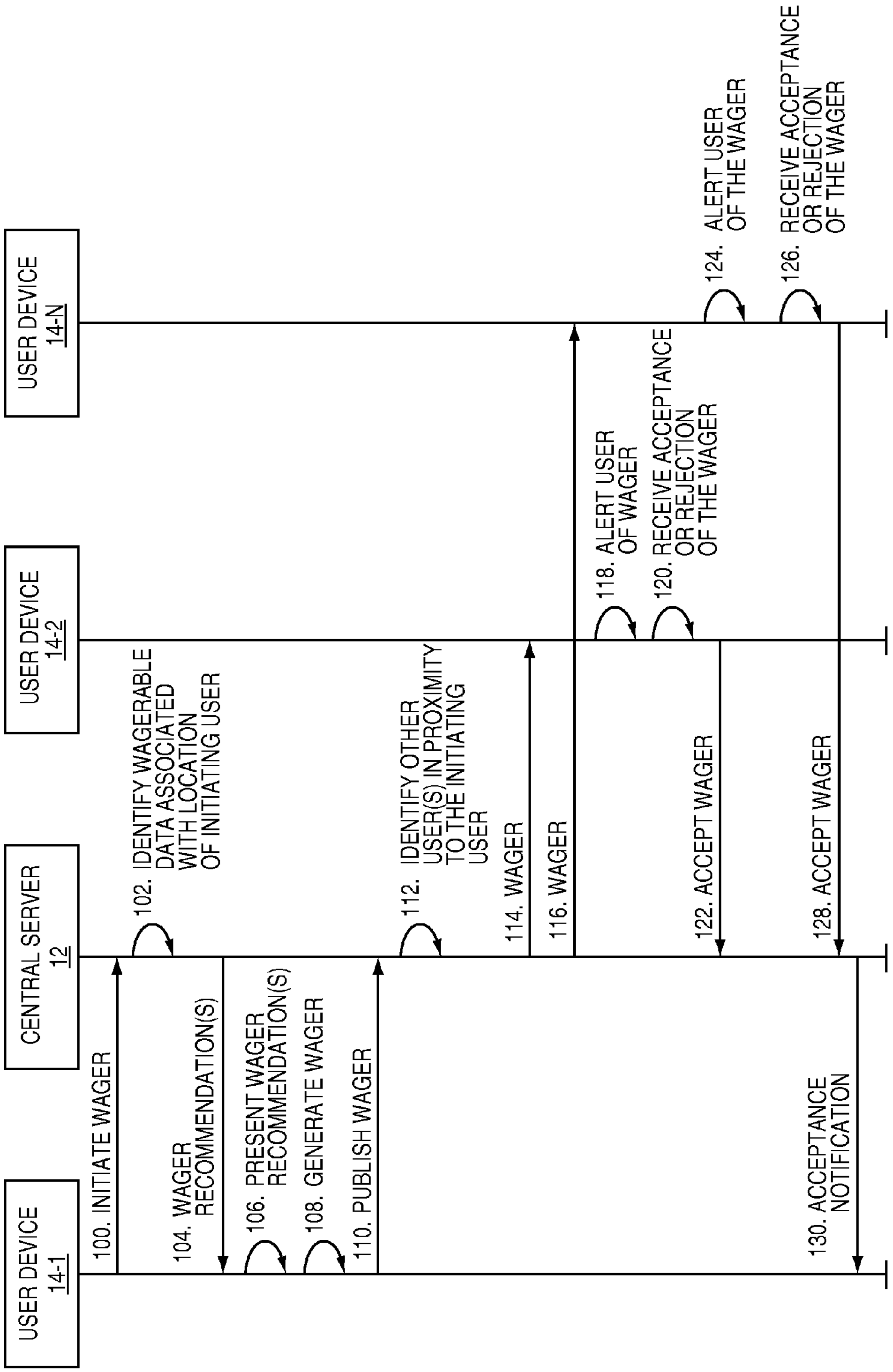
FIGS. 2A and 2B illustrate the operation of the system of FIG. 1 according to one embodiment of the present invention.
Figure 2B:
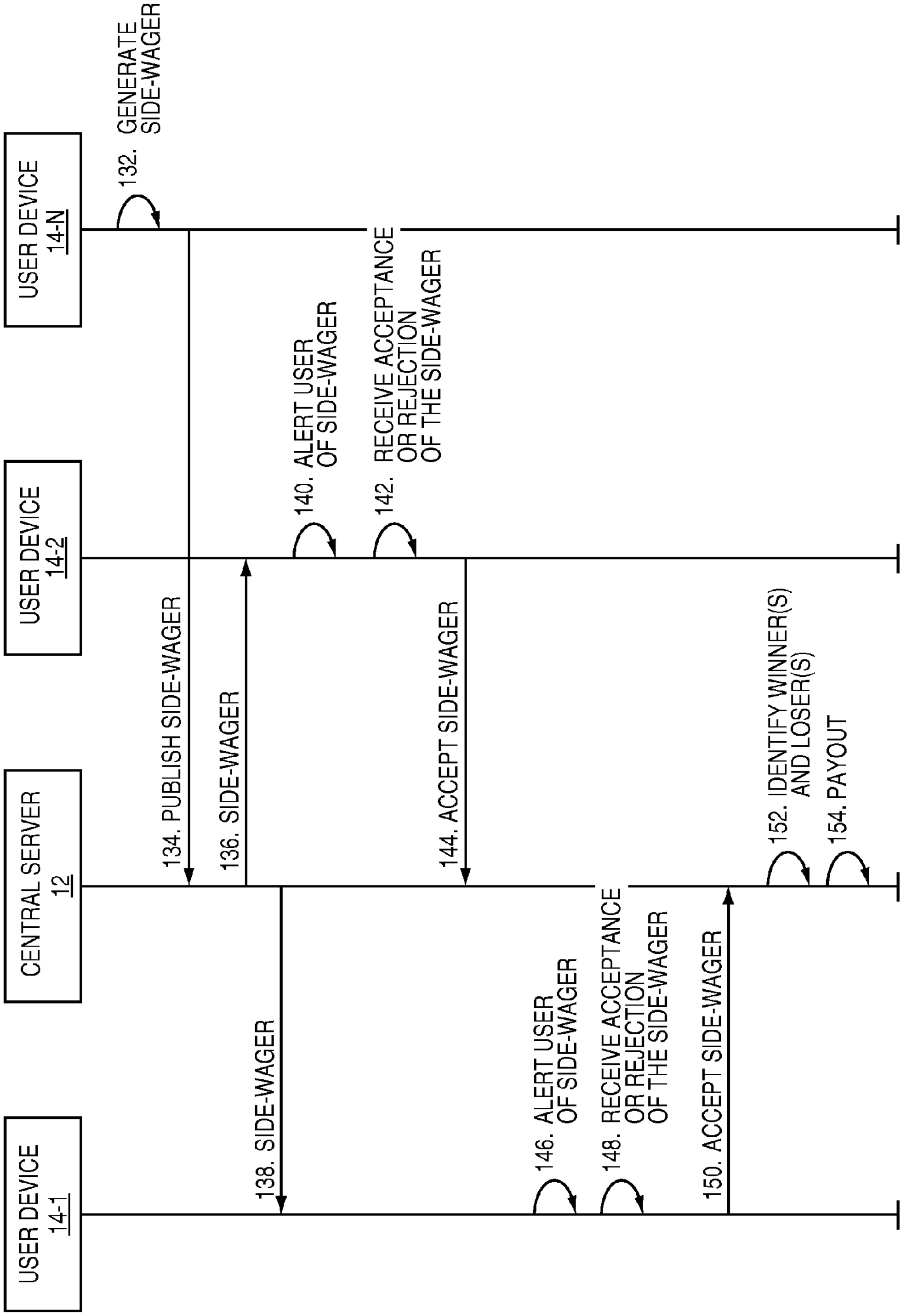

FIGS. 2A and 2B illustrate the operation of the system 10 of FIG. 1 according to one embodiment of the present invention. First, the user device 14-1 communicates with the wager manager 20 of the central server 12 to initiate a wager (step 100). More specifically, in this example, the user 16-1 may interact with the wagering client 36-1 of the user device 14-1 to request initiation of a wager. In response, the wagering client 36-1 may communicate with the wager manager 20 to initiate a wager. The wager manager 20 of the central server 12 then utilizes the wager bot 22 to identify wagerable data associated with a current geographic location of the user 16-1 (step 102). The wagerable data may be one or more wagerable events such as, for example, one or more sporting events being played at or near the location of the user; a weather forecast for the location of the user; wagerable information forming the basis of one or more trivia questions related to the location of the user; or the like.

More specifically, the wager manager 20 may first obtain the location of the user 16-1 from user account of the user 16-1. As discussed above, the location service 24 of the central server 12 obtains the locations of the users 16-1 through 16-N and stores their locations in corresponding user accounts in the user accounts repository 30. Alternatively, when initiating the wager, the wagering client 36-1 of the user device 14-1 may provide the location of the user 16-1 to the wager manager 20. Once the location of the user 16-1 is obtained, the wager manager 20 provides the location of the user 16-1 to the wager bot 22. In response, the wager bot 22 of the central server 12 searches one or more network sources to identify wagerable data associated with the location of the user 16-1 and returns the wagerable data to the wager manager 20. The wager manager 20 then generates one or more wager recommendations based on the wagerable data and sends the one or more wager recommendations to the wagering client 36-1 of the user device 14-1 (step 104).

As an example, a sporting event occurring at or near the location of the user 16-1 may be identified as a wagerable event. The wager manager 20 may then generate one or more wager recommendations such as, for example, a recommendation that the user 16-1 wager on a final score of the sporting event, a recommendation that the user 16-1 wager on which team will win the sporting event, a recommendation that the user 16-1 wager on which player will score next during the sporting event, a recommendation that the user 16-1 wager on whether a particular player will score next in the sporting event, or the like. As another example, a weather forecast for the location of the user 16-1 may be identified as a wagerable data. Based on the weather forecast, the wager manager 20 may then generate one or more wager recommendations such as, for example, a recommendation to wager on whether it will begin raining in the next thirty minutes, a recommendation to wager on whether it will stop raining in the next thirty minutes, or the like.

As a final example, information providing a basis for one or more trivia questions related to the location of the user 16-1 may be identified as the wagerable data. Based on this information, the wager manager 20 may then generate one or more trivia questions related to the location of the user 16-1. For example, the wagerable data may be that the American Idol singer David Cook was born in Houston, Tex. The wager manager 20 may then generate the trivia question: "Where was American Idol singer David Cook born?". Based on the one or more trivia questions, the wager manager 20 may then recommend a wager that the user 16-1 knows the answer to a trivia question where the user 16-1 is not enabled to preview the trivia question prior to making the wager, recommend a wager that other users do or do not know the answer to a trivia question where the other users are not enabled to preview the trivia question prior to accepting the wager, recommend a wager that the user 16-1 knows the answers to more of a set of trivia questions than other users accepting the wager, or the like.

Upon receiving the wager recommendations, the wagering client 36-1 of the user device 14-1 presents the wager recommendations to the user 16-1 (step 106). Then, based on user input from the user 16-1, the wagering client 36-1 of the user device 14-1 generates a wager (step 108). More specifically, the user 16-1 may provide input selecting a desired one of the wager recommendations and then define additional terms for the wager such as, for example, a monetary value or point value for the wager, a maximum exposure of the user 16-1 in terms of maximum dollar to point value or maximum number of other users than may accept the wager, or the like. In addition, if relevant, the user 16-1 may define a time period for the wager. The time period may be relevant if, for example, the wager is whether a particular player in a sporting event will score in the next fifteen (15) minutes. In addition, the user 16-1 may define a time-period during which other users may accept the wager. For example, the user 16-1 may define a five (5) minute time period during which other users may accept the wager and after which the wager will be closed. Lastly, the user 16-1 may define a maximum distance such that only other users located within the maximum distance from the user 16-1 will be alerted of the wager. Note that the above terms for the wager are exemplary and not intended to limit the scope of the present invention. The number and types of terms for the wager will vary depending on the specifics of the wager.

In an alternative embodiment, rather than generating and sending wager recommendations to the wagering client 36-1 of the user device 14-1, the wager manager 20 of the central server 12 may provide the wagerable data, or some subset thereof, to the wagering client 36-1 of the user device 14-1. For example, if the wagerable data includes a number of wagerable events, the wager manager 20 may send all of the wagerable events or one or more select ones of the wagerable events to the wagering client 36-1 of the user device 14-1. The select ones of the wagerable events may be selected based on one or more system-defined rules or based on the user preferences of the user 16-1. Then, the user 16-1 may select one of the wagerable events and define a wager for that wagerable event.

Once the wager is generated, the wagering client 36-1 of the user device 14-1 sends the wager to the wager manager 20 of the central server 12 for publication (step 110). The wager manager 20 of the central server 12 then identifies other users located in proximity to the user 16-1 (step 112) and publishes the wager to user devices of the identified users, which in this example are the user devices 14-2 and 14-N (steps 114 and 116). In one embodiment, the wager defines a maximum distance, and the other users are users located within the maximum distance from the user 16-1. If no maximum distance is defined, a default maximum distance may be used. Note that numerous alternative schemes for determining whether other users a proximate to the user 16-1 will be apparent to one of ordinary skill in the art upon reading this disclosure and are to be considered within the scope of the present invention.

In response to receiving the wager, the wagering client 36-2 of the user device 14-2 alerts the user 16-2 of the wager (step 118). For example, if the user device 14-2 is a mobile smart phone, the user device 14-2 may alert the user 16-2 by beeping, vibrating, displaying a message, or the like. The user 16-2 may then review the wager and choose whether to accept the wager. The wagering client 36-2 then receives user input corresponding to an acceptance or rejection of the wager from the user 16-2 (step 120). In this example, the user 16-2 accepts the wager. As such, the wagering client 36-2 communicates with the wager manager 20 of the central server 12 to accept the wager on behalf of the user 16-2 (step 122). Likewise, in response to receiving the wager, the wagering client 36-N of the user device 14-N alerts the user 16-N of the wager (step 124). For example, if the user device 14-N is a mobile smart phone, the user device 14-N may alert the user 16-N by beeping, vibrating, displaying a message, or the like. The user 16-N may then review the wager and choose whether to accept the wager. The wagering client 36-N then receives user input corresponding to an acceptance or rejection of the wager from the user 16-N (step 126). In this example, the user 16-N accepts the wager. As such, the wagering client 36-N communicates with the wager manager 20 of the central server 12 to accept the wager on behalf of the user 16-N (step 128).

In this example, the wager manager 20 of the central server 12 then sends a notification to the wagering client 36-1 of the user device 14-1 to notify the user 16-1 that the users 16-2 and 16-N have accepted the wager (step 130). In one embodiment, once the users 16-2 and 16-N have accepted the wager, the wager is complete. In another embodiment, the user 16-1 may be presented with a list of the other users 16-2 and 16-N that have accepted his wager and may be enabled to finalize the wager by allowing the wager with all of the other users 16-2 and 16-N that have accepted the wager, terminate the wager with all of the other users 16-1 and 16-N that have accepted the wager, or terminate the wager with one or more of the other users 16-2 and 16-N that have accepted the wager. If the user 16-1 is enabled the terminate the wager with all or some of the other users that have accepted the wager, the initial wager created by and published on behalf of the user 16-1 may more specifically be referred to as a wager invitation that invites other users to make the wager with the user 16-1. Then, by accepting the wager invitation, the users 16-2 and 16-N offer the wager to the user 16-1. The user 16-1 may then choose to accept or reject the wagers from the users 16-2 and 16-N.

In this example, in addition to accepting the wager, the user 16-N interacts with the wagering client 36-N to define a side-wager. In response, the wagering client 36-N generates the side-wager (step 132). The side-wager is a wager associated with the wager created by the user 14-1. For example, if the wager created by the user 14-1 is a wager on which of two sports teams will win a sporting event, the side-wager may be which player will score the most points in the sporting event, which player will score the most points over a defined period of time, or the like. The wagering client 36-N then sends the side-wager to the wager manager 20 of the central server 12 for publication (step 134). The wager manager 20 of the central server 12 then sends the side-wager to the user devices 14-2 and 14-1 of the other users 16-2 and 16-1 participating in the wager created by the user 14-1 (steps 136 and 138).

In response to receiving the side-wager, the wagering client 36-2 alerts the user 16-2 of the side-wager (step 140). The user 16-2 may then review the side-wager and choose whether to accept the side-wager. The wagering client 36-2 then receives user input corresponding to an acceptance or rejection of the side-wager from the user 16-2 (step 142). In this example, the user 16-2 accepts the side-wager. As such, the wagering client 36-2 communicates with the wager manager 20 of the central server 12 to accept the side-wager on behalf of the user 16-2 (step 144). Likewise, in response to receiving the side-wager, the wagering client 36-1 alerts the user 16-1 of the side-wager (step 146). The user 16-1 may then review the side-wager and choose whether to accept the side-wager. The wagering client 36-1 then receives user input corresponding to an acceptance or rejection of the side-wager from the user 16-1 (step 148). In this example, the user 16-1 accepts the side-wager. As such, the wagering client 36-1 communicates with the wager manager 20 of the central server 12 to accept the side-wager on behalf of the user 16-1 (step 150). While not illustrated, the user 16-N may be notified of the other users 16-1 and 16-2 that accepted his side-wager.

At this point, one or more winners and one or more losers for the wager and side-wager are identified by the wager manager 20 of the central server 12 (step 152). In a first exemplary embodiment, an auto-determination process is performed by the wager manager 20 where the wager manager 20 automatically determines the winner(s) and loser(s) of the wager and side-wager. For example, if the wager is a wager on which of two teams win a sporting event, the wager manager 20 may query a remote source for a final score of the sporting event and then determine the winner of the sporting event. Based on the winner of the sporting event, the wager manager 20 determines the winner(s) and loser(s) of the wager. Further, if the side-wager is whether a specified player will score within a defined period of time, the wager manager 20 may query a remote play-by-play service to determine whether the specified player scored within the defined period of time.

In a second exemplary embodiment, the wagering client 36-1 of the user device 14-1 of the user 16-1 that created the wager may automatically determine the winner(s) and loser(s) of the wager and report the winner(s) and loser(s) to the wager manager 20. Likewise, the wagering client 36-N of the user device 14-N of the user 16-N that created the side-wager may automatically determine the winner(s) and loser(s) of the side-wager and report the winner(s) and loser(s) to the wager manager 20. For example, if the wager is which song will be played next on a particular radio station, then the wagering client 36-1 may sample the audio content broadcast on the radio station using, for example, a microphone of the user device 14-1 and identify the next song played on the radio station based on the sample(s) of the audio content. The wagering client 36-1 may then automatically determine the winner(s) and loser(s) of the wager and report the winner(s) and loser(s) to the wager manager 20.

In a third exemplary embodiment, wagering clients 36-1, 36-2, and 36-N may automatically determine whether the corresponding users 16-1, 16-2, and 16-N won or lost the wager and side-wager using an auto-determination process. For example, if the wager is which song will be played next on a particular radio station, then the wagering clients 36-1, 36-2, and 36-N may sample the audio content broadcast on the radio station using, for example, microphones of the user devices 14-1, 14-2, and 14-N to identify the next song played on the radio station. The wagering clients 36-1, 36-2, and 36-N may then automatically determine whether their corresponding users 16-1, 16-2, and 16-N won or lost the wager. The wagering clients 36-1, 36-2, and 36-N may then notify the wager manager 20 of whether the users 16-1, 16-2, and 16-N are winners or losers of the wager and side-wager.

In fourth exemplary embodiment, the creator of the wager, which in this example is the user 16-1, and the creator of the side-wager, which in this example is the user 16-N, determine the winner(s) and loser(s) of the wager and side-wager, respectively. The users 16-1 and 16-N may then notify the wager manager 20 of the winners and losers of the wager and side-wager via the corresponding wagering clients 36-1 and 36-N.

In a fifth embodiment, the users participating in the wager and side-wager, which in this example are the users 16-1, 16-2, and 16-N, elect a user to determine the winners and losers of the wager and side-wager. The elected user may be one of the users 16-1, 16-2, and 16-N participating in the wager and side-wager or another user that is not participating in the wager and side-wager. The elected user may then notify the wager manager 20 of the winners and losers of the wager and side-wager via a corresponding user device.

Once the winners and losers of the wager and side-wager are determined, the payout function 26 of the central server 12 operates to exchange money or points between the users 16-1, user 16-2, and 16-N participating in the wager and side-wager (step 154). More specifically, if the wager and side-wager are monetary wagers, the payout function 26 debits and credits financial accounts of the users 16-1, 16-2, and 16-N such that the money is awarded to the winners of the wager and side-wager and paid by the losers of the wager and side-wager. For example, the financial accounts of the users 16-1, 16-2, and 16-N may be maintained by the financial service 28. Note that if the current jurisdiction imposes a tax, the payout function 26 may impose the tax prior to distribution of the money. If the wager and side-wager are wagers for points, or virtual chips, then the payout function 26 may subtract points from total point values maintained for the losers of the wager and side-wager and add points to total point values maintained for the winners of the wager and side-wager.

In an alternative embodiment, if the wager and side-wager are monetary wagers, then the determination of the winner(s) and loser(s) of the wager and side-wager and/or payout may be performed outside of the system 10. For instance, the users 16-1, 16-2, and 16-N may arrange a place and time to meet to determine the winners and losers of the wager and side-wager and to exchange money accordingly.

Figure 3:
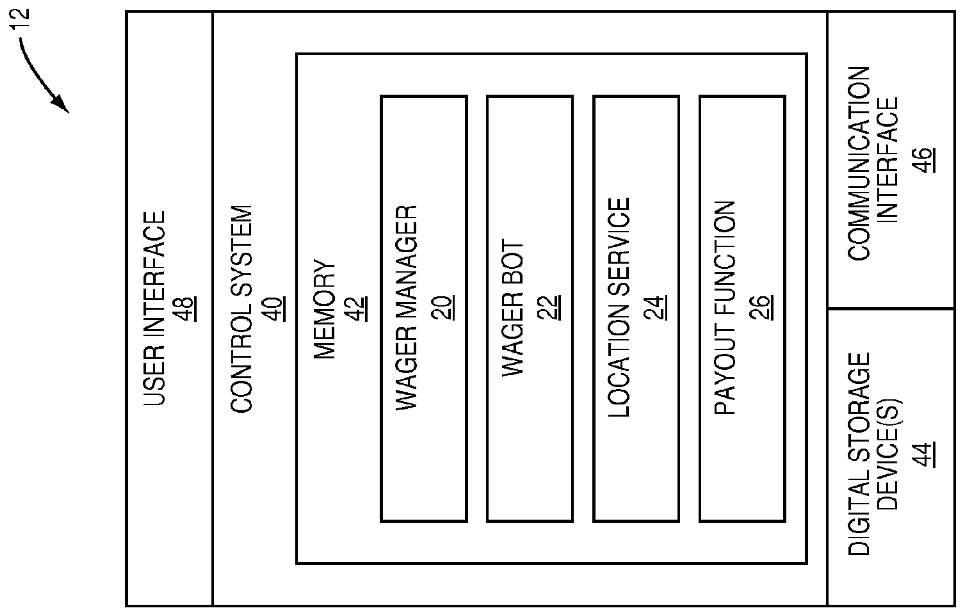
FIG. 3 is a block diagram of the central server of FIG. 1 according to one embodiment of the present invention.

FIG. 3 is a block diagram of the central server 12 according to one embodiment of the present invention. In general, the central server 12 includes a control system 40 having associated memory 42. In this example, the wager manager 20, the wager bot 22, the location service 24, and the payout function 26 are implemented in software and stored in the memory 42. However, the present invention is not limited thereto. Each of the wager manager 20, the wager bot 22, the location service 24, and the payout function 26 may be implemented in software, hardware, or a combination thereof. Further, while the wager manager 20, the wager bot 22, the location service 24, and the payout function 26 are illustrated separately, any two or more of the wager manager 20, the wager bot 22, the location service 24, and the payout function 26 may be combined into a single software and/or hardware application. The central server 12 may also include one or more digital storage devices 44. In one embodiment, the user accounts repository 30, the wager repository 32, and/or the jurisdictional information 34 are stored in the one or more digital storage devices 44. However, the present invention is not limited thereto. The central server 12 also includes a communication interface 46 communicatively coupling the central server 12 to the network 18 (FIG. 1). Lastly, the central server 12 may include a user interface 48, which may include components such as, for example, a display, one or more user input devices, or the like.

Figure 4:
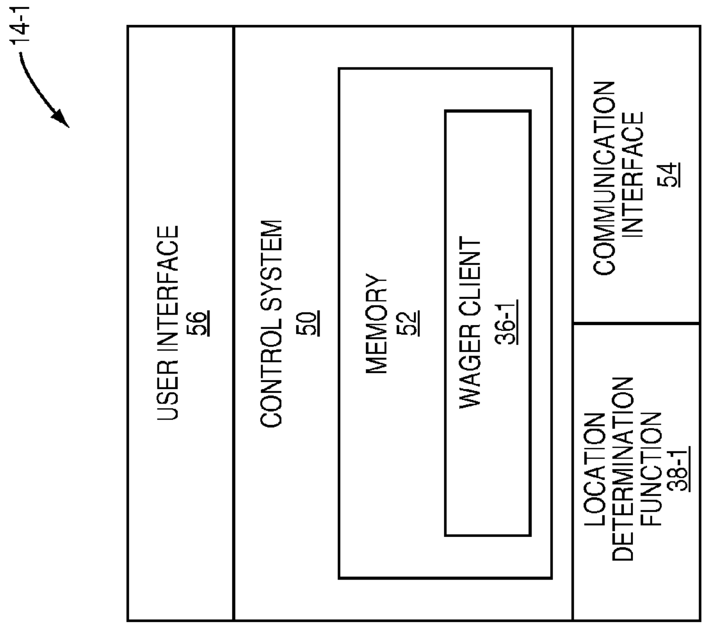
FIG. 4 is a block diagram of one of the user devices of FIG. 1 according to one embodiment of the present invention.

FIG. 4 is a block diagram of the user device 14-1 of FIG. 1 according to one embodiment of the present invention. This discussion is equally applicable to the other user devices 14-2 through 14-N. In general, the user device 14-1 includes a control system 50 having associated memory 52. In this example, the wagering client 36-1 is implemented in software and stored in the memory 52, and the location determination function 38-1 is implemented in hardware (e.g., GPS receiver) and connected to the control system 50. However, the present invention is not limited thereto. Each of the wagering client 36-1 and the location determination function 38-1 may be implemented in software, hardware, or a combination thereof. The user device 14-1 also includes a communication interface 54 communicatively coupling the user device 14-1 to the network 18 (FIG. 1). Lastly, the user device 14-1 includes a user interface 56, which includes components such as, for example, a display, one or more user input devices, or the like.

Those skilled in the art will recognize improvements and modifications to the preferred embodiments of the present invention. All such improvements and modifications are considered within the scope of the concepts disclosed herein and the claims that follow.

What is claimed is:

1. A method of operation of a central server, comprising:

identifying wagerable data associated with a location of a first user, by performing an internet search for wagerable data associated with the location of the first user;

generating a wager recommendation based on the wagerable data;

providing the wager recommendation to a user device of the first user;

receiving a wager based on the wager recommendation from the user device of the first user;

identifying a second user located in proximity to the first user;

publishing the wager to a user device of the second user located in proximity to the first user;

if the second user accepts the wager, receiving a response from the user device of the second user indicating that the second user has accepted the wager;

notifying the first user that the second user has accepted the wager; and receiving information identifying a winner of the wager from a user device of a user elected to determine the winner of the wager; wherein the election is made by the users participating in the wager.

2. The method of claim 1 wherein the wagerable data is a wagerable event.

3. The method of claim 2 wherein the wagerable event is a sporting event, and the wager recommendation is related to the sporting event.

4. The method of claim 1 wherein the wagerable data is weather data for the location of the first user, and the wager recommendation is related to weather at the location of the first user.

5. The method of claim 1 wherein the wagerable data is information forming a basis for a trivia question related to the location of the first user, and the wager recommendation is based on the trivia question related to the location of the first user.

6. The method of claim 1 wherein the wagerable data is information forming a basis for a plurality of trivia questions related to the location of the first user, and the wager recommendation is based on the plurality of trivia questions related to the location of the first user.

7. The method of claim 1 wherein the wager is a monetary wager, and the method further comprises crediting a financial account of a one of the first and second users identified as the winner of the wager and debiting a financial account of an other one of the first and second users being a loser of the wager.

8. The method of claim 7 wherein a jurisdiction in which the first and second users are located imposes a tax on monetary wagers, and the method further comprises imposing the tax prior to crediting the financial account of the one of the first and second users identified as the winner of the wager.

9. The method of claim 1 wherein the wager is a non-monetary wager, and the method further comprises crediting a total point value maintained for a one of the first and second users identified as the winner of the wager and debiting a total point value maintained for an other one of the first and second users being a loser of the wager.

10. The method of claim 1 further comprising:

receiving a side-wager from the user device of the second user;

publishing the side-wager to the user device of the first user; and if the first user accepts the side-wager, receiving a response from the user device of the first user indicating that the first user has accepted the side-wager.

11. The method of claim 1 wherein identifying the second user located in proximity to the first user comprises identifying the second user located within a defined distance from the first user.

12. The method of claim 1, wherein the elected user is one of the users participating in the wager.

13. The method of claim 1, wherein the elected user is a user that is not participating in the wager.

14. The method of claim 1, wherein the elected user notifies a wager manager via the user device of the elected user.

15. The method of claim 1, wherein the election is performed separately for each separate wager.

16. A method of operation of a central server, comprising:

identifying wagerable data associated with a location of a first user, by performing an internet search for wagerable data associated with the location of the first user;

providing at least a subset of the wagerable data associated with the location of the first user to a user device of the first user;

receiving, from the user device of the first user, a wager based on the at least a subset of the wagerable data;

identifying a second user located in proximity to the first user;

publishing the wager to a user device of the second user located in proximity to the first user;

if the second user accepts the wager, receiving a response from the user device of the second user indicating that the second user has accepted the wager;

notifying the first user that the second user has accepted the wager; and receiving information identifying a winner of the wager from a user device of a user elected to determine the winner of the wager; wherein the election is made by the users participating in the wager.

17. A central server comprising:

a) a communication interface communicatively coupling the central server to a plurality of user devices via a network, each of the plurality of user devices associated with one of a plurality of users; and b) a control system associated with the communication interface and adapted to:

i) identify wagerable data associated with a location of a first user of the plurality of users, by performing an internet search for wagerable data associated with the location of the first user;

ii) generate a wager recommendation based on the wagerable data;

iii) provide the wager recommendation to a first user device of the plurality of user devices that is associated with the first user;

iv) receive a wager based on the wager recommendation from the first user device of the first user;

v) identify a second user of the plurality of users that is located in proximity to the first user;

vi) publish the wager to a second user device of the plurality of user devices that is associated with the second user located in proximity to the first user;

vii) if the second user accepts the wager, receive a response from the second user device associated with the second user indicating that the second user has accepted the wager;

viii) notify the first user at the first user device that the second user has accepted the wager; and, ix) receive information identifying a winner of the wager from a user device of a user elected to determine the winner of the wager; wherein the election is made by the users participating in the wager.

18. A central server comprising:

a) a communication interface communicatively coupling the central server to a plurality of user devices via a network, each of the plurality of user devices associated with one of a plurality of users; and b) a control system associated with the communication interface and adapted to:

i) identify wagerable data associated with a location of a first user of the plurality of users, by performing an internet search for wagerable data associated with the location of the first user;

ii) provide at least a subset of the wagerable data to a first user device of the plurality of user devices that is associated with the first user;

iii) receive a wager based on the at least a subset of the wagerable data from the first user device of the first user;

iv) identify a second user of the plurality of users that is located in proximity to the first user;

v) publish the wager to a second user device of the plurality of user devices that is associated with the second user located in proximity to the first user;

vi) if the second user accepts the wager, receive a response from the second user device associated with the second user indicating that the second user has accepted the wager;

vii)notify the first user at the first user device that the second user has accepted the wager; and viii) receive information identifying a winner of the wager from a user device of a user elected to determine the winner of the wager; wherein the election is made by the users participating in the wager.

* * * * *